Patented Jan. 22, 1935

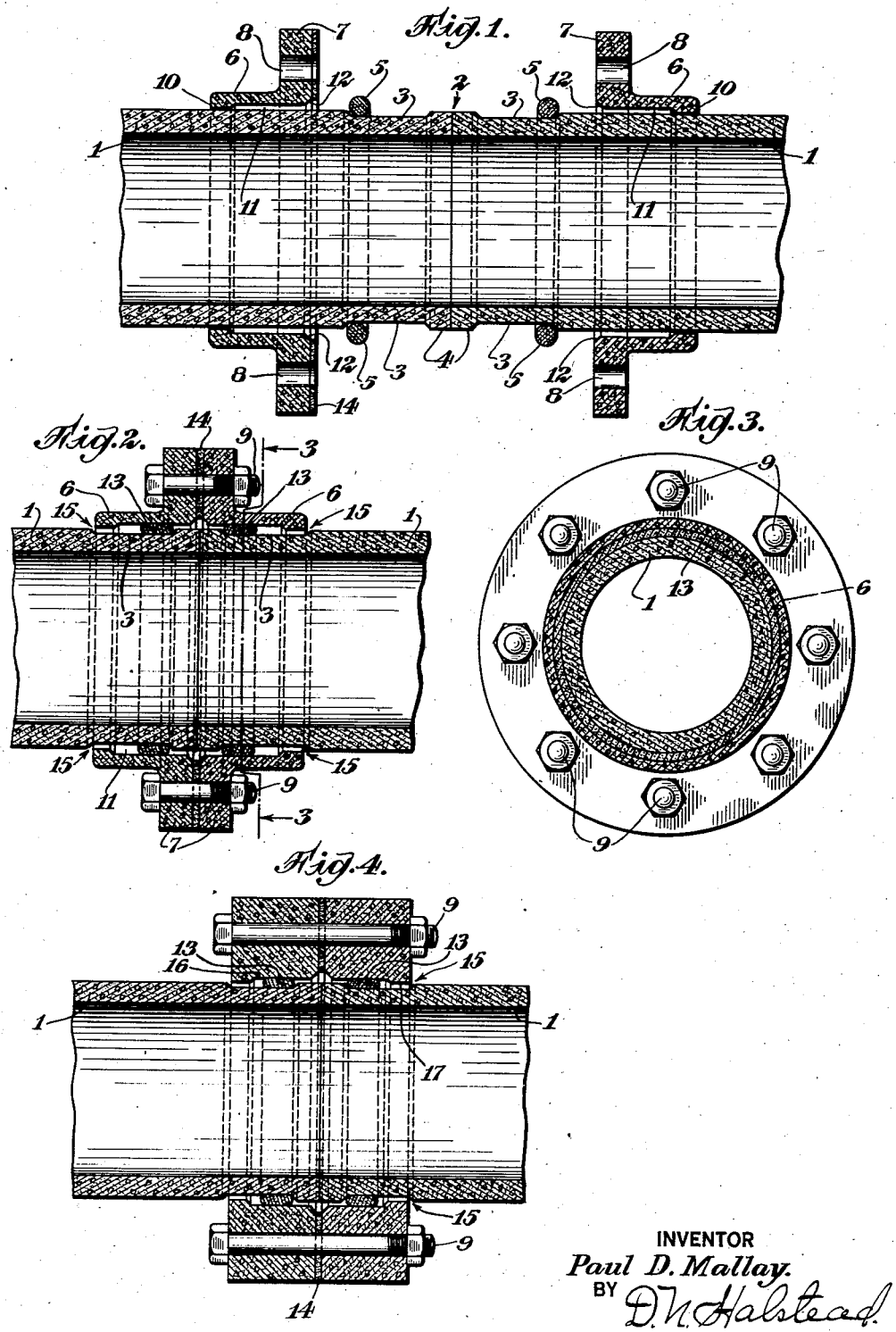

1,988,694

UNITED STATES PATENT OFFICE 1,988,694

PIPE JOINT ASSEMBLY

Paul D. Mallay, Larchmont, N. Y., assignor to Johns-Manville Corporation, New York, N. Y., a corporation of New York Application January 31, 1933, Serial No. 654,367

1 Claim. (Cl. 285—137)

This invention relates to a pipe joint assembly, particularly to one adapted for use in joining sections of pipe that are relatively breakable under excessive compression or flexing.

The structure of the invention is suited especially for joining sections of pipe comprising asbestos fibers and Portland cement in compressed and densified and then hardened condition.

It is an object of the invention to provide a fluid-tight pipe joint assembly that is readily assembled in the field, that forms a joint providing flexibility in the finished pipe line, and that limits the amount of compression which may be applied to the outside of the ends of the sections of pipe that are being joined, even though the assembly is being made by unskilled workmen. Additional objects and advantages will appear as the description of the invention progresses.

An embodiment of the invention that is preferred at this time is illustrated in the drawing in which:

Fig. 1 shows a longitudinal sectional view of an assembly that is not completed;

Fig. 2 shows a similar view of the completed assembly;

Fig. 3 shows a cross-sectional view on line 3—3 of Fig. 2; and

Fig. 4 shows a longitudinal sectional view of a form of the pipe joint assembly in which the flange is not provided with a hub element, but carries a restraining shoulder on the edge of the inner portion of the flange proper.

In the figures there are shown sections of pipe 1 that may be of a more or less fragile nature, such as the asbestos and Portland cement composition referred to above. These sections are arranged end to end, in approximately abutting relationship, to form a joint between adjacent ends, as illustrated at 2. The adjacent ends are provided with recesses 3, which are somewhat removed from the joint itself, to provide for upstanding shoulders 4 between the recesses and the pipe section ends.

Disposed around the adjoining ends of the pipe sections and suitably within the recesses 3, are elastic, resilient, readily deformable sealing rings or elements 5, of rubber or the like. These rings are suitably of diameter that is originally somewhat less than that of the portion of the pipe around which they fit. Thus, the rings are stretched in being placed over the pipe and, once in position, contact firmly therewith.

The assembly includes also adjacent flanges, each including, advantageously, a hub element or inner portion 6 or 16 and an upstanding portion or element 7 provided with holes 8, through which bolts 9 are secured in the finished assembly. The hub elements, at their edges nearest to the joint, carry the upstanding portions. At the edge that is remote from the joint, the hub elements are provided each with an inwardly projecting circumferential shoulder 10, which forms a recess 11 between the remainder of the hub element and the pipe. This recess extends from the edge of the hub element nearest to the joint to the beginning of the shoulder. Furthermore, the hub element may be beveled at its edge nearest to the joint, as indicated at 12, to facilitate moving the hub element over the sealing ring, towards the joint, in making the finished assembly.

The method of making the finished assembly is largely evident from the drawing and the description that has been given.

The ring flanges and then the rubber sealing rings are placed over the ends of the sections of pipe that are to be joined, one flange and one ring to each of the said ends, and the ends of the pipe are then brought approximately into abutment, so that the pipe sections are arranged end to end, all as illustrated in Fig. 1. The flanges are then forced over the sealing rings, in such manner as to compress the sealing rings in the recesses between the pipe and the hub or inner portion of the flange element, as illustrated at 13 in Figs. 2 and 4. Suitably, the sealing rings are compressed in the finished assembly to approximately one-half of their original thickness. By selection of the original ring thickness and the depth of the recesses between the hub element of the flange and the pipe, it is possible to establish in advance the approximate extent of compression which is applied, through the resilient sealing rings, to the ends of the section of pipe.

When the flanges are in position, they are secured to each other at the upstanding portions, as by the bolts 9; that is, one flange is secured to the adjacent flange on the opposite side of the joint. The flanges may be bolted very tightly without affecting appreciably the extent of compression of the fragile pipe ends inside the sealing rings.

The two flanges so secured to each other are caused to form a fluid-tight joint therebetween. To facilitate this forming of the fluid-tight joint between the two adjoining flange elements, a gasket 14 may be present in the joint between the two flanges, as illustrated in Figs. 2 and 4. This gasket may be composed of conventional material, as, for example, asbestos fiber and rubber compound, and may be essentially a flat ring.

A pipe joint constructed as described is capable of withstanding a considerable end thrust. A strong end thrust causes adjacent sections of pipe to separate from each other and to compress the ring sealing element between the shoulder 4 on the ends of the pipe sections and the shoulders 10 or 17 on the flange element.

To increase the flexibility of the structure, the hub elements or inner portions of the flanges may extend a shorter distance from the joint between adjacent pipe sections than the recesses in the pipes themselves extend from the said joint, as illustrated at 15. This provision adapts the hub element, at the edge remote from the joint, to be moved into the recess in close proximity to the side thereof, or away from it, as the pipe line is flexed. At the same time the restraining shoulders 4 and 10 or 17 on the ends of the pipe sections and the edge of the hub elements or inner portions of the flanges, respectively, prevent the complete lateral displacement of the pair of bolted-together flanges from over the pipe joint and prevent also the blowing out of the rubber ring sealing elements under hydrostatic pressure.

It will be noted that the inner portions of the flanges may be spaced at all points from the ends of the pipe sections disposed within the said flanges. This increases further the flexibility of the joint assembly.

As stated, the invention is particularly suitable for use in joining sections of asbestos and Portland cement pipe. With such pipe and with flanges and also fastening elements 9 that are non-corrodible, as they are in the preferred embodiment of the invention, there is produced a joint assembly which in all parts is non-corrodible. For example, the flanges and fastening elements may be constructed of steel of high chromium content, a nickel chromium alloy, or the like. Or, non-metallic compositions may be used in the flange element, as, for example, hard rubber or phenol aldehyde condensation products.

When non-metallic compositions are used, additional strength may be obtained by making the flange element proper as thick as the hub element. In other words, the so-called hub element in this case is simply the edge of the flange, as illustrated in the modification shown in Fig. 4. Here the shoulder 17 is at the edge portion of the flange which is remote from the joint between adjacent flanges or adjacent pipe sections.

In general, the flanges referred to above are representative of and include any ring elements of suitable shape and design for the purpose, disposed, one each, around the several ends of adjoining pipe sections and over readily compressible, resilient sealing rings thereon and adapted to be secured to an adjacent ring element, to form a two-piece sleeve over the pipe joint. The hub element referred to is typical of and includes the inner portion of the ring element, such as the inner portion 16 of the flanges illustrated in Fig. 4.

The details that have been given are for the purpose of illustration, not restriction, and many variations may be made therefrom without departing from the spirit and scope of the invention.

What I claim is:

A pipe joint assembly comprising sections of pipe arranged end to end, in approximately abutting relationship, to form a joint between adjacent ends, and provided with circumferential recesses in the outer wall of the pipe sections, near the ends thereof, resilient, readily deformable ring sealing elements disposed in the said recesses, and closing means disposed around the ends of the adjoining pipe sections and over the sealing rings, in contacting relationship with the rings, and extending on opposite sides of the joint a slightly lesser distance than the said recesses extend, whereby an end of the closing means may be moved into the said recess, in close proximity to the side thereof, when the assembly is flexed.

PAUL D. MALLAY.